Oct. 8, 1957 W. J. KOMMERS 2,808,719
MATERIALS WEARTESTER
Filed April 2, 1954 4 Sheets-Sheet 1

INVENTOR
WILLIAM J. KOMMERS

BY George Sipkin
B. L. Tanquist
ATTORNEY

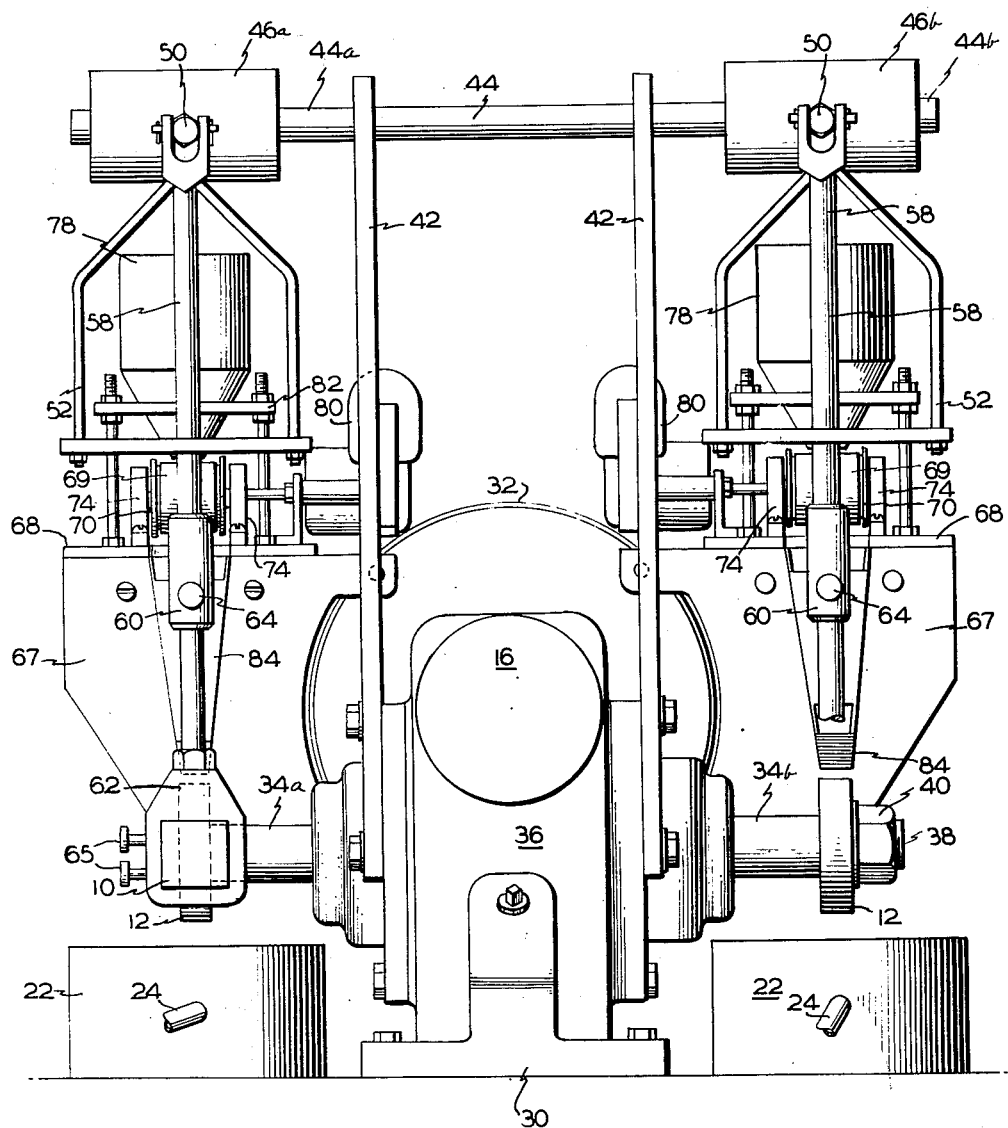

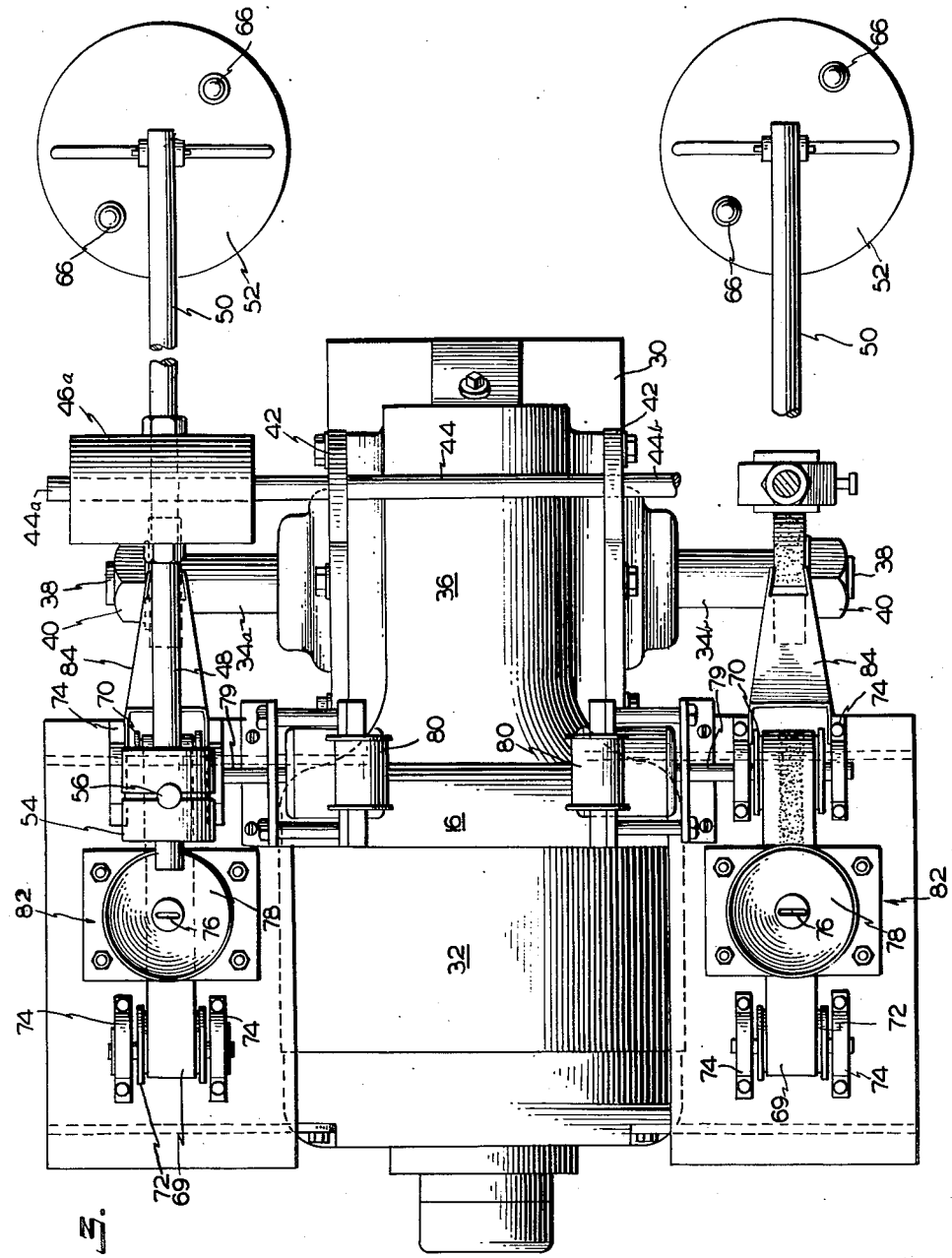

Oct. 8, 1957  W. J. KOMMERS  2,808,719
MATERIALS WEARTESTER
Filed April 2, 1954  4 Sheets-Sheet 4
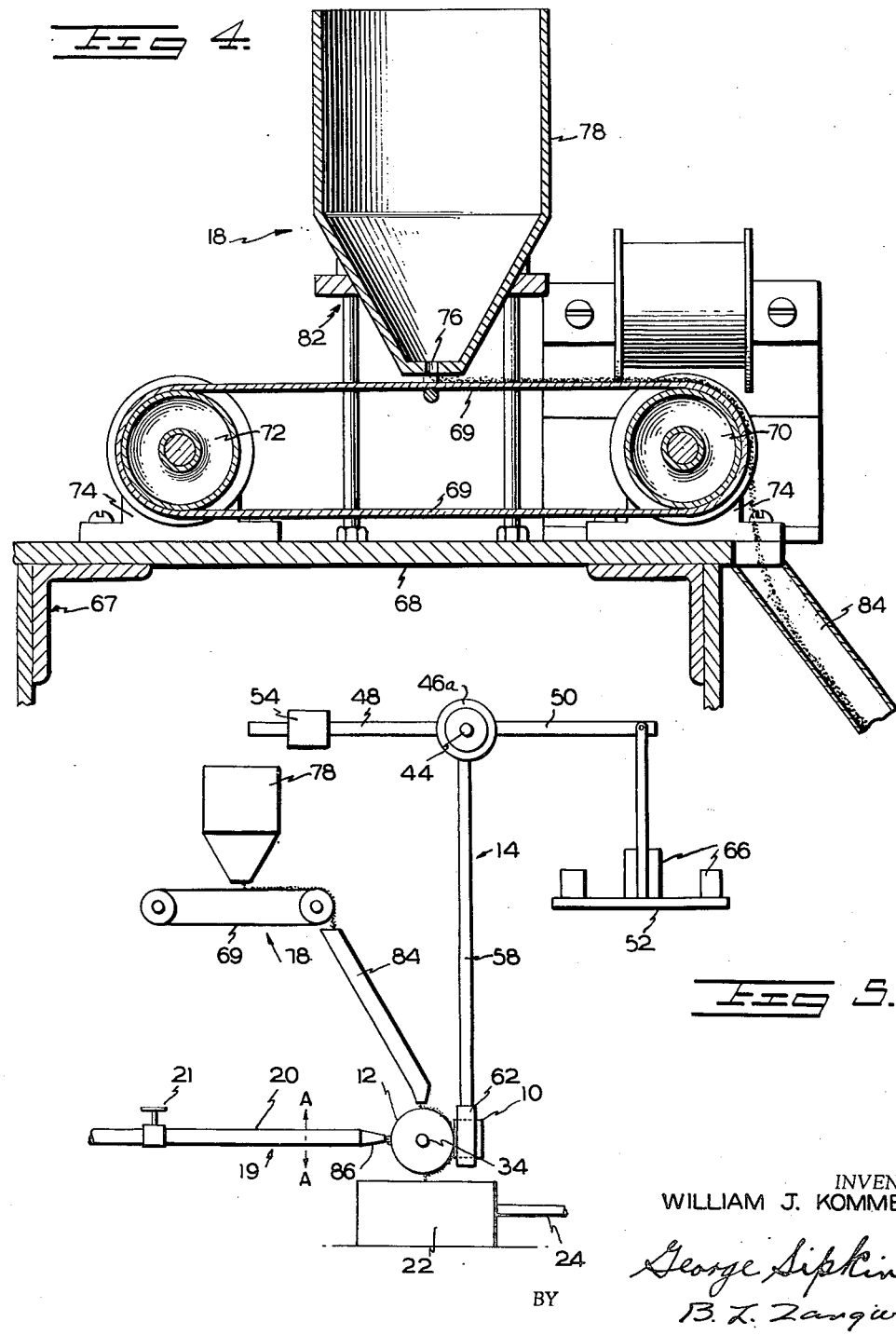
INVENTOR
WILLIAM J. KOMMERS
BY George Sipkin
B. L. Zangwill
ATTORNEY

United States Patent Office 2,808,719
Patented Oct. 8, 1957

2,808,719

MATERIALS WEARTESTER

William J. Kommers, Severna Park, Md., assignor to the United States of America as represented by the Secretary of the Navy Application April 2, 1954, Serial No. 420,762

15 Claims. (Cl. 73—7)

(Granted under Title 35, U. S. Code (1952), sec. 266)

The invention described herein may be manufactured and used by or for the Government of the United States of America for governmental purposes without the payment of any royalties thereon or therefor.

Broadly, this invention relates to improved means for determining the resistance of a solid to wear; and more particularly, the invention relates to improved means for determining the relative wear resistances of various journal and bearing materials.

An object of the invention is to provide a wear-testing machine for obtaining an indication of the wearing qualities of journal and bearing materials, the machine being so arranged that the journal material in the form of a shaft of desired size and configuration can be rotated, under controlled conditions, against a bearing material of desired shape and size.

In accordance with the invention, the bearing material is controllably pressed against the rotating journal. To hasten the wearing, a metered abrasive is fed to the rotating journal. By operating the journal for a predetermined time at a constant speed, wear conditions can be observed. By repeating the test under the same conditions but with different materials, a degree of correlation of the wear characteristics of the materials can be obtained.

A machine based upon the teachings of the invention has certain novel features and distinct advantages among which are: (1) The factors involved in the testing of the materials can be selected and controlled, so that standardization of test conditions can thus be obtained. (2) The machine and its method of operation produce wear patterns that are easily measured and compared in a relatively short time and at a low cost, and an indication is quickly obtained of the wearing qualities of materials whose life is expected to be measured in years. (3) Bulk properties of the tested materials are determined rather than mar or scratch resistance. (4) Accurate evaluation of the relative wear resistances of journal and bearing materials under the selected and controlled conditions can be made. (5) The machine uses abrasive particles to cause quick wear, the abrasive particles being metered dry and then wetted and collected after each use. (6) The machine uses a lubricant, which may be water, to carry the abrasive particles between the test specimens, and to wash the used abrasive away. (7) the machine is such that spent abrasive and wear products do not noticeably affect the results. (8) The machine is simple, inexpensive, and easy to operate and manipulate.

Other objects and many of the attendant advantages of this invention will be readily appreciated as the same becomes better understood by references to the following detailed description when considered with the accompanying drawings wherein:

Figure 2 is a front elevational view, with parts broken away for clarity;

Figure 3 is a plan view, with parts broken away for clarity;

Figure 4 is an enlarged sectional view of the abrasive feeding mechanism of the machine; and Figure 5 is a schematic diagram illustrating the cooperation of component parts of the machine.

Figure 1:
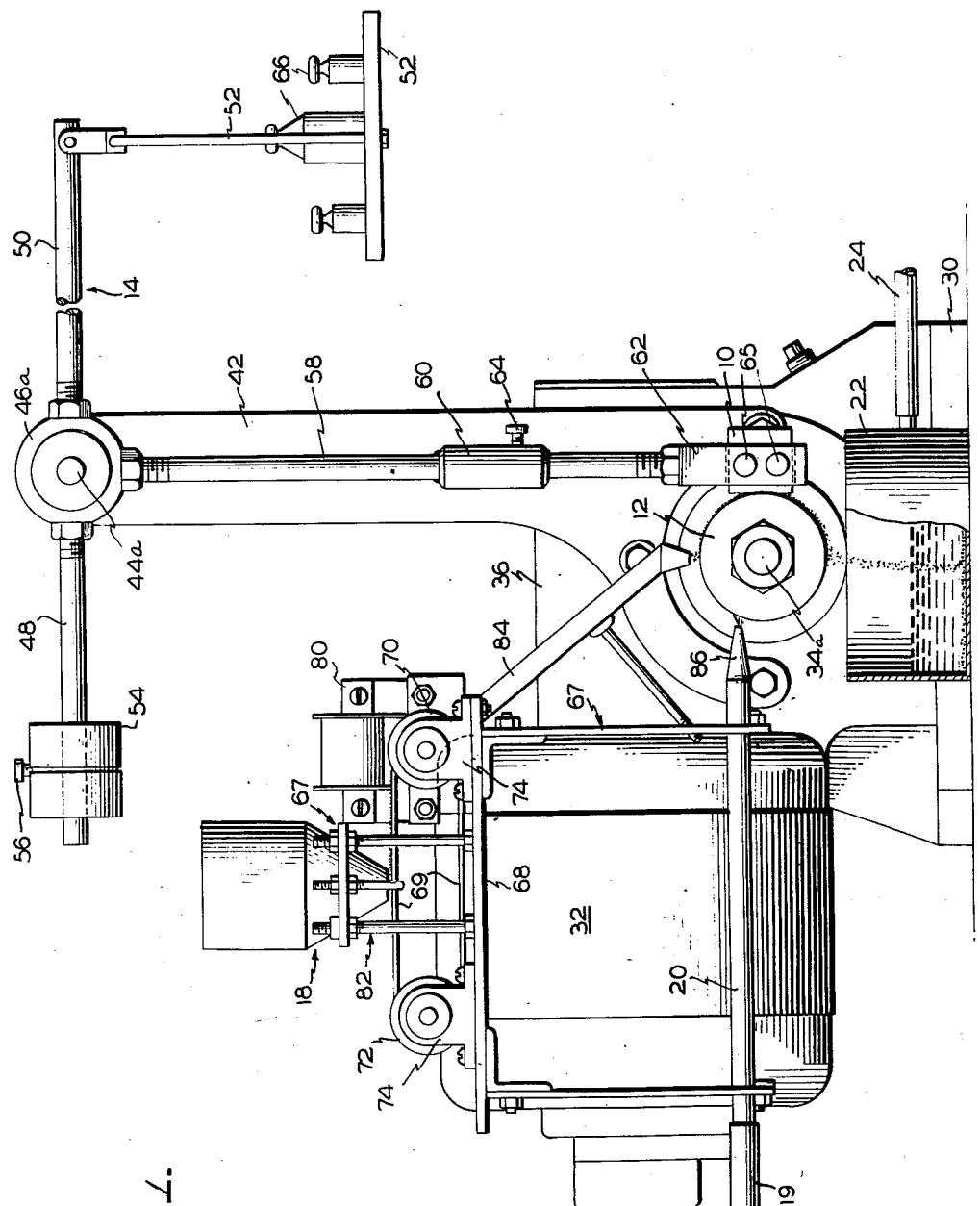
Figure 1 is a side elevational view, partly in section, of a machine embodying the invention.

Referring first to Figure 5, a machine embodying the principles of the invention comprises a specimen 10 of a bearing material supported and pressed against a specimen 12 of a journal material which is driven rotatively (clockwise in Fig. 5) by any suitable driving means. In various figures, the bearing holding and pressing means and the driving means are indicated in their entireties by the reference numerals 14 and 16, respectively.

An abrasive feeding means, indicated in its entirety by the reference numeral 18, at a substantially uniform rate constantly feeds abrasive particles of a substantially uniform size to the top of the rotating journal specimen 12. The abrasive is carried around on the journal by a liquid film on the journal established by a liquid feeding means indicated in its entirety by the reference numeral 19. The liquid feeding means 19 includes a pipe 20 and a control valve 21 by means of which the amount of liquid fed to the journal specimen 12 can be controlled. Preferably the liquid flow is adjusted so that enough of a film is carried around by the journal to trap all of the abrasive particles fed to the journal by the abrasive feeding means 18, and to provide an excess that will flow downwardly on the journal from the point where the liquid is first fed thereto. This excess should be adequate to wash or flush all solid particles downwardly from the rising part of the journal specimen into a spent-abrasive catching means 22 provided with an overflow pipe 24 through which excess liquid, but not abrasive particles, drains off.

An actual machine embodying the foregoing components is illustrated in Figs. 1–4. This particular machine is designed to carry out two tests at the same time. The embodiment comprises a base plate 30 on which is mounted the driving or journal-rotating means 16. The last comprises a motor 32 which drives a driving shaft 34 through gearing 36. The shaft 34 has journal supporting portions 34a and 34b which extend outwardly on both sides of the machine. Each portion has a narrowed cylindrical shoulder end 38 on which a journal specimen 12 is fitted. The end 38 is threaded for receiving a nut means 40 that secures the specimen to the shaft for rotation therewith.

The bearing specimen 10 is supported preferably to make a horizontal line contact initially with the journal specimen. Consequently, the latter has circular cross-sections; and the former has a planar test surface when prepared for test. The bearing specimen 10 is carried in the holding and pressing means 14 which comprises a pair of uprights 42 secured directly or indirectly to the base plate 30. The upper ends of the uprights 42 support a stationary horizontal shaft 44 having ends 44a and 44b to which the inner races of ball bearings are secured so that their outer race-housings 46a and 46b are free to oscillate. Each of the housings carries a means that holds a bearing specimen in operative position and presses it against its associated journal. The means for both housings are essentially the same, as are the remaining structures on each side of the machine, so that a description of only one side should suffice for both.

The housing 46a has a pair of aligned rods 48 and 50 extending horizontally from opposite sides thereof to provide a lever system having the shaft 44a as a pivot and having rigid lever arms substantially free from spring action. A scale pan 52 depends from the outer end of the rod 50, and an adjustable counterweight 54 is carried by the outer end of the rod 48, being releasably securable thereto by thumb screw means 56.

Secured to and vertically depending from the race housing 46a is a specimen-supporting arm 58 comprising a coupling 60 and a lower, removable holder 62 releasably, rotatively and vertically adjustably held by the coupling 60 through thumb screw 64.

The bearing holder 62 comprises a frame having a square opening that receives the specimen bearing material 10. The specimen 10 can be horizontally adjusted in the frame and then held in place by screws 65.

Obviously, the bearing specimen 10 can be placed in its holder 62 and the lever system balanced until the vertical test surface of the bearing specimen is barely in or is slightly out of contact with the outer cylindrical surface of the journal specimen 12 on the shaft portion 34a. By then placing known weights 66 on the scale pan 52, it is obvious that the bearing will press against the journal with a force that can be calculated from the dimensions of the lever system. In an actual embodiment as shown in Figs. 1-4, the distance from the intersection of the longitudinal axis of arm 58 with the axis of the shaft portion 44a to the pivot point of the scale pan on the rod 48 is twelve inches; and the distance from the same axis to the horizontal plane through the center of the shaft 34 and the initial contact line of the specimens is also twelve inches. An indication of the size of a machine can be gathered from this information. An advantage of the lever system resides in the substantially unvarying force with which the bearing is pressed against the journal during a test, the force remaining constant although the materials wear.

The abrasive feeding means 18 is mounted on a platform structure 67 which is carried directly or indirectly by the base plate 30 in any suitable manner. The platform structure 67 comprises a platform 68. An endless belt 69 of the feeding means 18 is held on a driving pulley 70 and driven pulley 72 which are rotatably supported by standards 74 carried by the platform 68. The endless belt 69 is of uniform thickness, and preferably of rubberized material. The belt is supported to provide a taut horizontal upper run on which dry abrasive particles from the open mouth 76 of a hopper 78 can flow. The mouth 76 is preferably oblong and of less width than the belt 69.

The abrasive feeding means also provides for controlling the feed of abrasive particles. To this end, the driving pulley 70 is rotated at a constant speed, and the hopper 78 is adjustably carried. The pulley 70 is driven through any suitable connecting means 79 by a constant speed motor 80 which may be a synchronous clock or timing motor. The hopper 78 is carried on a framework 82 in a manner that permits the hopper to be vertically adjusted so that its mouth can be controllably spaced from the upper run of the belt 69. The motor 80 and the framework 82 are carried by the platform structure 67 which also carries a tapering chute 84 through which abrasive particles falling from the belt 69 are directed onto the top of the journal specimen 12, the mouth of the chute 84 being adjacent and not wider than the specimen.

The abrasive particles leaving the chute 84 are trapped by a liquid lubricant film placed on the upper part periphery of the journal specimen by the liquid feeding means 19, the film being constantly maintained. The liquid feeding means 19 comprises a fish-tail nozzle 86 discharging onto the journal slightly above its horizontal diametric axis. The vertical positioning, indicated by arrow A in Fig. 5, controls the relative amounts of the fluid being carried with or against the rotation of the journal. The nozzle 86 is fed through the pipe 20, and the liquid flow is controlled by the valve 21 or any suitable means. A flow meter, not shown, indicates the flow of fluid. Any suitable liquid can be used as the lubricant. Distilled water and tap water at room temperature have been found to be satisfactory. In some instances, tap water may not wet the journal surface adequately to entrap all of the falling abrasive particles. In such instances, a small amount of wetting agent can be thoroughly mixed with the water for overcoming the difficulty. A sulphonated oil, such as Rohm and Haas "Triton X-100," in amounts in a ratio of 4 parts of oil to 10,000 parts of water by volume has been found suitable for Annapolis, Maryland, tap water.

The liquid supplied to the journal should be adequate in quantity to provide a film over the journal that will trap substantially all of the abrasive particles from the chute and to provide an excess that flows downwardly by gravity against the lower part of the rising surface of the journal below the nozzle 86. This downward flow should wash all the abrasive particles passing once between the journal and bearing specimens into the abrasive catching means or container 22 from which the water can drain. By timing the operation of the machine, and catching, drying, washing out the wear products and weighing the abrasive used, the amount of abrasive used can be ascertained for the observed wear of the materials in the timed period.

The operation of the machine is believed to be fairly obvious. As a preliminary, the abrasive and liquid feeds are adjusted. Journal specimens and bearing specimens which have been machined to size and weighed are secured on the shaft 34 and in the holder 62, respectively. The pressing means is balanced with the bearing specimen in the lightest of contact, preferably slightly out of contact, with the journal specimen. Known weights 66 are added to the scale pan 52. The drive motor 32 and the flow of liquid from the liquid feeding means 20 are set into operation. The feed motor 80 is started, and the time of the test measured from the time the abrasive particles reach the journal.

During testing, the metered liquid discharged from nozzle 86 wets the outside of the rotating journal specimen 12 and forms a liquid film thereon that is carried by the journal past the mouth of the chute 84. The film traps the abrasive particles coming from the chute and carries them between the pressed-together journal and bearing materials. Excess water from the nozzle 86 flows downwardly on the journal against the direction of rotation and washes the used abrasive particles and wear products from the bottom of the journal into the catching means or container 22. The effluent drains through discharge overflow 24.

The metering of the abrasive particles in the dry state and the metering of the supply liquid are quite an advantage, since it makes possible consistent and uniformly-composed slurries for the wear tests. Moreover, the total amount of abrasive used can be measured by simply drying and weighing the abrasive caught in the container 22 during the time of a test.

The shape of the outside surface of the journal has been shown as that of a cylinder. However, it can obviously be shaped as desired in the form of any surface of revolution. Similarly, the surface of the bearing that bears against the journal surface is subject to control. Obviously, the factors of journal speed, bearing load, type of abrasive, abrasive particle size, abrasive feed rate, amount and type of liquid lubricant and the kinds of journal and bearing materials can all be selected and controlled. By standardizing, comparative tests are possible. However, it is pointed out that, in general, only journal material and moisture condition of the bearings have a decidedly pronounced effect on bearing wear, at least on customary materials.

An indication of the operation of an actual embodiment, following the showing of Figs. 1-4, can be gathered from the following data of actual tests.

Abrasive particles—dry polishing grains of aluminum oxide that pass through a U. S. standard No. 50 sieve but not a No. 60 sieve—fed at a rate of forty grams per hour.

Initial linear speed of outer journal surface—fifty feet per minute.

Lubricant—tap water at seventy degrees Fahrenheit with the aforesaid sulphonated oil added as a wetting agent—fed at a rate of one hundred thirty cubic centimeters per minute.

Journals—cylindrical shape of two and one-eighth inches outside diameter, five-eighth inch inside diameter and one-half inch width.

Bearings—test faces one inch square.

Load force pressing bearing towards journal, four pounds per inch of width of journal.

Tests consisted of a total wear-time of one hour. Preferably, the bearing specimen, which is wider than the journal, is centered vertically and horizontally with respect to the journal contact area to insure that the final wear pattern will lie within the edges of the bearing test surface. If desired, after each five or ten minutes' interval the machine can be stopped and the test surfaces wiped clean. Wear can be measured in any suitable way as, for example, by loss of volume of the journal, and by the bearing wear pattern. The depth of the latter can be ascertained by a dial indicator. Journal volume measured by determining loss in weight during test and computing from known density of the material.

The following table indicates the average results obtained under the above conditions for one-hour tests.

| Journal Material | No. of Tests | Bearing Material | | | |
|---|---|---|---|---|---|
| | | Lignum Vitae | | Buna N Rubber | |
| | | Journal Vol. Loss, Cub. Cent. | Bearing Wear, Inches Depth | Journal Vol. Loss, Cub. Cent. | Bearing Wear, Inches Depth |
| Monel | 6 | 0.0025 | 0.0212 | 0.0226 | 0.0067 |
| H Monel | 3 | .0027 | .0228 | .0281 | .0065 |
| S Monel | 3 | .0030 | .0238 | .0281 | .0049 |
| Composition: | | | | | |
| M Bronze | 3 | .0051 | .0263 | .0246 | .0054 |
| Titanium | 3 | .0065 | .0285 | .0159 | .0048 |
| Aluminum Bronze #1 | 6 | .0125 | .0127 | .0091 | .0000 |
| Aluminum Bronze #2 | 3 | .0134 | .0133 | .0155 | .0012 |

The following table indicates the results obtained under the same conditions but without the use of any abrasive particles.

| Journal Material | No. of Tests | Bearing Material | | | |
|---|---|---|---|---|---|
| | | Lignum Vitae | | Buna N Rubber | |
| | | Journal Vol. Loss, Cub. Cent. | Bearing Wear, Inches Depth | Journal Vol. Loss, Cub. Cent. | Bearing Wear, Inches Depth |
| Monel | 6 | 0.00033 | 0.0027 | −0.00005 | 0.0007 |
| H Monel | 3 | .00053 | .0037 | .00039 | .0011 |
| S Monel | 3 | −.00004 | .0050 | −.00022 | .0013 |
| Composition: | | | | | |
| M Bronze | 3 | .00098 | .0052 | .00062 | .0012 |
| Titanium | 3 | .00033 | .0055 | .00024 | .0006 |
| Aluminum Bronze #1 | 6 | .00004 | .0038 | .00001 | .0004 |
| Aluminum Bronze #2 | 3 | .00044 | .0038 | .00033 | .0012 |

Obviously, many modifications and variations of the present invention are possible in the light of the above teachings. It is therefore to be understood that within the scope of the appended claims the invention may be practiced otherwise than as specifically described.

What is claimed is:

1. A method of determining wearing characteristics of two materials, a first of which has a round outer test surface and the second of which has a test surface adapted to bear toward the first said test surface, said method comprising rotating said first material for a time, during said time pressing said materials towards each other with said test surfaces facing, feeding out dry abrasive particles at a substantially uniform rate, wetting said particles and feeding them during said time to said round test surface for passage between said surfaces, and removing said particles from said round test surface after they pass between said test surfaces a first time.

2. A method of determining wearing characteristics of two materials, a first of which has a round outer test surface and the second of which has a test surface adapted to bear toward the first said test surface, said method comprising rotating said first material for a time, during said time pressing said materials toward each other with a substantially unvarying force, feeding out dry abrasive particles at a substantially uniform rate, wetting said particles and feeding them during said time to said round test surface for passage between said surfaces, and removing said particles from said round test surface after they pass between said test surfaces a first time, collecting and drying said removed particles, and weighing said dried particles.

3. A method of determining wearing characteristics of two materials, a first of which has a round outer test surface and the second of which has a test surface adapted to face toward the first said test surface, said method comprising rotating said first material for a time, during said time pressing said materials toward each other with a substantially unvarying force, metering out dry abrasive particles and feeding them to a point at the top of said test surface of said rotating material, applying a wetting liquid lubricant to said rotating test surface at a point below the first said point, and removing said particles from said round test surface after they pass between said test surfaces a first time.

4. A method of determining wearing characteristics of two materials, comprising forming a round first test surface of a first of said materials and a planar test surface for the second of said materials, rotating said first test surface for a time, during said time pressing said test surfaces toward each other with a substantially unvarying force, feeding out dry abrasive particles at a substantially uniform rate, wetting said particles and feeding them during said time to said round test surface for passage between said surfaces, and removing said particles from said round test surface after they pass between said test surfaces a first time.

5. A method of determining wearing characteristics of a test specimen of material comprising relatively moving said specimen past a surface adapted for continuous contact therewith, feeding dry abrasive particles toward said specimen, and wetting and passing said particles between said specimen and said surface.

6. A method of determining wearing characteristics of a specimen of material, said specimen having a round outer test surface, said method comprising rotating said specimen for a time, during said time pressing a surface of another member against said round outer test surface of said specimen, feeding out dry abrasive particles at a substantially uniform rate, wetting said particles and feeding them during said time to said round test surface for passage between the round test surface and the surface of the other member, and removing said particles from said round test surface after they pass between said respective surfaces a first time.

7. A materials wear-testing machine of a type described for ascertaining wearing characteristics of relatively rotating materials, comprising a shaft, means for rotating said shaft, said shaft having a portion to which a test specimen of a first of said materials is secured to provide a rotating test surface, holding means for holding a test specimen of the second of said materials, said second test specimen having a bearing test surface, said holding means holding said second specimen with its test surface facing a portion of said round test surface, said holding means comprising a lever system for pressing said facing surfaces toward each other, means for continuously feeding out dry abrasive particles, and means for wetting said particles and carrying them on said round test surface between said facing surfaces.

8. A materials wear-testing machine as described in claim 7 but further characterized by said holding means further comprising means for horizontally and vertically adjusting the position of said second test surface with respect to the round test surface, whereby the two surfaces can be placed in desired spatial relation.

9. A materials wear-testing machine of a type described for ascertaining wearing characteristics of relatively rotating materials, comprising a shaft, means for rotating said shaft, said shaft having a portion to which a test specimen of a first of said materials is secured to provide a rotating test surface, holding means for holding a test specimen of the second of said materials, said second test specimen having a bearing test surface, said holding means holding said second specimen with its test surface facing a portion of said round test surface, said holding means comprising a lever system for pressing said facing surfaces toward each other, abrasive-particle feed-means, hopper means, means for controlling the rate of continuous flow of abrasive particles from said hopper means to said round test surface, liquid discharge means having a nozzle means discharging a spray of liquid across the width of said round test surface on the side thereof opposite said bearing test surface, and means for controlling the flow of liquid from said liquid discharge means.

10. A materials wear-testing machine of a type described for ascertaining wearing characteristics of relatively rotating materials, comprising a shaft, means for rotating said shaft, said shaft having a portion to which a test specimen of a first of said materials is secured to provide a rotating test surface, holding means for holding a test specimen of the second of said materials, said second test specimen having a bearing test surface, said holding means holding said second specimen with its test surface facing a portion of said round test surface, said holding means comprising a lever system for pressing said facing surfaces toward each other, abrasive particle feeding means comprising a belt having a substantially horizontal upper run, driving means for said belt, hopper means having an open discharge mouth over said run, means for controlling the rate of continuous flow of particles from said mouth to said run, a chute receiving the particles from said belt and feeding them to said round test surface, and liquid discharge means having a nozzle means discharging a spray of liquid across the width of said round test surface on the side thereof opposite said bearing test surface.

11. A materials wear-testing machine of a type described for ascertaining wearing characteristics of relatively rotating materials, comprising a shaft, means for rotating said shaft, said shaft having a portion to which a test specimen of a first of said materials is secured to provide a rotating test surface, holding means for holding a test specimen of the second of said materials, said second test specimen having a bearing test surface, said holding means holding said second specimen with its test surface facing a portion of said round test surface, abrasive-particle feeding means comprising a belt having a substantially horizontal upper run, driving means for said belt, hopper means having an open discharge mouth over said run, means for controlling the rate of continuous flow of particles from said mouth to said run, a chute receiving the particles from said belt and feeding them to said round test surface, liquid discharge means having a nozzle means discharging a spray of liquid across the width of said round test surface on the side thereof opposite said bearing test surface, means for controlling the flow of liquid from said liquid discharge means, means for removing said particles after they pass between said surfaces, and a container for receiving said removed particles.

12. A materials wear-testing machine of a type described for ascertaining wearing characteristics of relatively rotating materials, comprising a shaft, means for rotating said shaft, said shaft having a portion to which a test specimen of a first of said materials is secured to provide a rotating test surface, holding means for holding a test specimen of the second of said materials, said second test specimen having a bearing test surface, said holding means holding said second specimen with its test surface facing a portion of said round test surface, said holding means comprising a lever system for pressing said facing surfaces toward each other, said lever system comprising an upright arm having a lower end provided with a frame for said second specimen, a horizontal balance arm means, pivot means for said balance arm means, said upright arm being secured to said balance arm means, means for continuously feeding dry abrasive particles, and means for wetting said particles and carrying them on said round test surface between said facing surfaces.

13. A materials wear-testing machine as described in claim 12 but further characterized by said holding means further comprising means for horizontally and vertically adjusting the position of said second test surface with respect to the round test surface, whereby the two surfaces can be placed in desired spatial relation.

14. A materials-testing machine for determining wearing characteristics of a material, comprising a framework supporting a power driven shaft adapted to carry a test specimen, pressure-applying means carried by said framework and adapted to hold a specimen contacting member, and pressing means spaced from the member for urging the member into contact with the specimen, abrasive feeding means mounted on said framework and adapted to associate abrasive with the test specimen, whereby abrasive is delivered between the specimen and the specimen contacting member; and wetting means positioned adjacent the specimen for wetting the abrasive prior to delivery between the specimen and the specimen contacting member, and for removing said abrasive from the specimen after it passes once between said specimen and said contacting member.

15. A materials wear-testing machine for determining wearing characteristics of a material, comprising a framework supporting a power driven rotary shaft adapted to carry a test specimen for rotation therewith, movable means adapted to hold a specimen contacting member, pressing means acting on said movable means for urging the specimen contacting member into contact with the test specimen, abrasive feeding means for depositing abrasive between the test specimen and the contacting member and wetting means adjacent the rotary shaft for wetting the abrasive prior to delivery between said specimen and contacting member, and for removing said abrasive from the specimen after it passes once between said specimen and said contacting member.

References Cited in the file of this patent

UNITED STATES PATENTS

| | | |
|---|---|---|
| 1,478,335 | Hudson et al. | Dec. 18, 1923 |
| 1,491,050 | Lutz | Apr. 22, 1924 |
| 1,801,314 | Landolt | Apr. 21, 1931 |
| 1,944,353 | Lindner | Jan. 23, 1934 |
| 2,412,221 | Kallas et al. | Dec. 10, 1946 |
| 2,414,439 | Brandon | Jan. 21, 1947 |